Oct. 21, 1952 — W. N. DEAN — 2,615,157
RANGING AND IDENTIFICATION SYSTEM
Filed May 21, 1946 — 2 SHEETS—SHEET 1
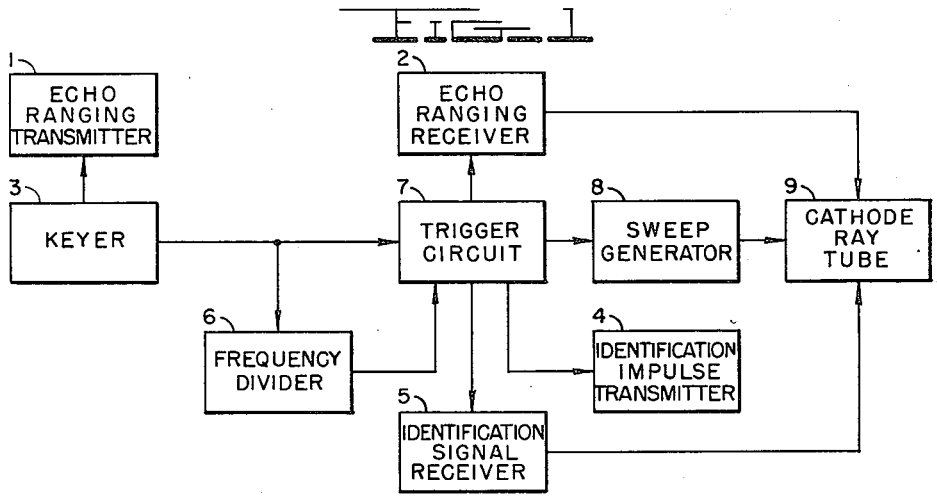
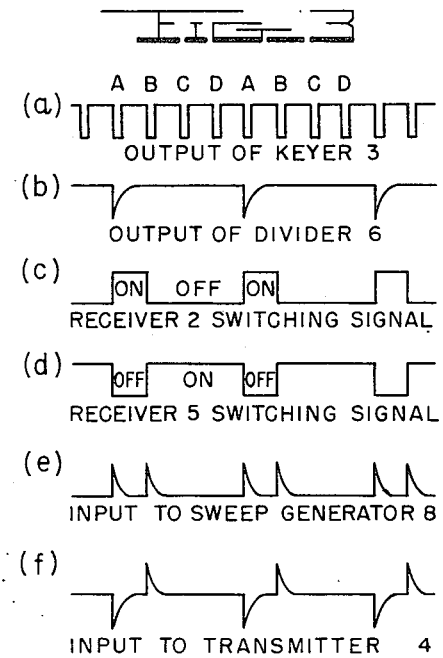
INVENTOR
WALTER N. DEAN
BY
ATTORNEYS

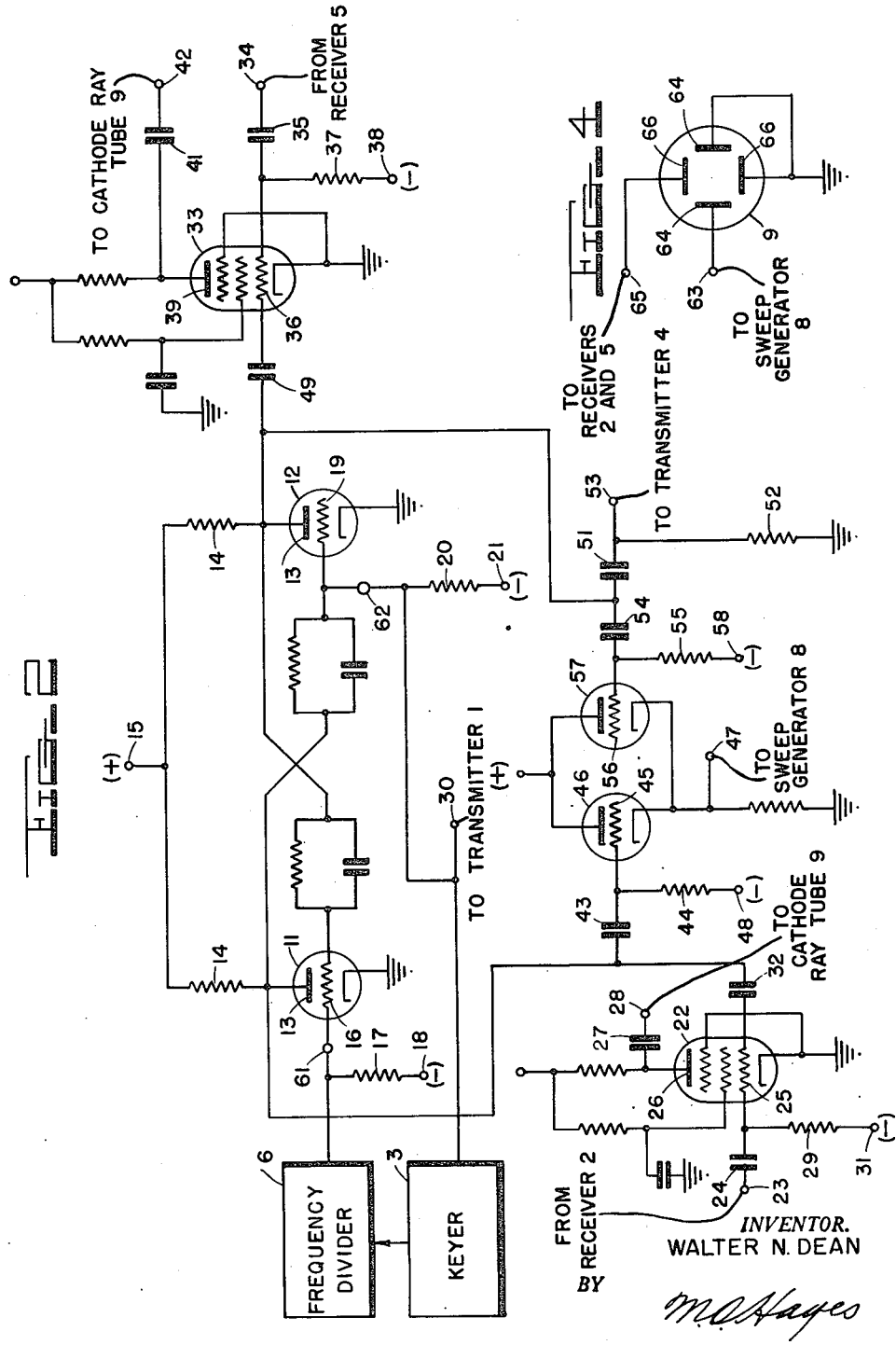

Patented Oct. 21, 1952

2,615,157

UNITED STATES PATENT OFFICE 2,615,157

RANGING AND IDENTIFICATION SYSTEM

Walter N. Dean, Larchmont, N. Y., assignor to the United States of America as represented by the Secretary of the Navy Application May 21, 1946, Serial No. 671,178

2 Claims. (Cl. 343—6)

This invention relates to echo ranging and obstacle identification systems and is particularly directed to the problem of coordinate operation of such systems when the repetition rate of one of the systems is some multiple of the repetition rate of the other system.

In echo ranging systems a transmitted impulse is reflected from an obstacle, and the elapsed time between transmission and echo reception is employed to determine the range of the object. In obstacle identification systems, a transmitted interrogation impulse is received by a receiver installed on the obstacle. A transmitter servile to the receiver is also installed on the obstacle. This unit, the transponder, is operative responsively to a received signal from the interrogator to emit a signal which identifies the obstacle. This signal is detected by a local receiver.

In such systems, radio frequency electromagnetic impulses are normally employed. The transmitted and reflected signals are commonly directly indicated on a cathode ray tube time base. In coordinate operation of an echo ranging system and obstacle identification system the information received from the two systems is presented on a common cathode ray indicator tube. Information from the two different systems is presented on the cathode ray tube screen during different sweeps of the electron beam, the sweep repetition rate being such that the signals from both systems appear to the eye to be present on the cathode ray tube screen simultaneously.

In some cases, the repetition rate of the impulses transmitted by the radar system is some integral multiple such as 5 or 6 of the repetition rate of the impulses transmitted by the IFF system. In such a case, when the same target is sending back reflected signals in response to the transmitted impulses from the echo ranging system and is also sending back transmitted signals from the transponder in response to the interrogating impulses from the identification system, there will be correspondingly as many of the former signals as of the latter. If all the signals received by the echo ranging system were indicated on the cathode ray tube time base, these indications would have an intensity much greater than the intensity of the indications of the less frequent signals received by the obstacle identification system. This condition would make it difficult to adjust both signal indications for optimum intensity on the cathode ray tube screen.

It is accordingly an object of this invention to provide for coordinate operation of the echo ranging and recognition systems, when one of the systems has a repetition rate which is some multiple of the repetition rate of the other system, without revision in their normal operation.

It is another object of the invention to provide a common indicator for such echo ranging and identification systems.

It is another object of the invention to present alternately on the screen of a cathode ray indicator tube information from the echo ranging system and the identification system, and to reject those additional signals from the higher repetition rate system which are due to its higher repetition rate, so as to equalize the intensity of illumination of the signals from the two systems on the cathode ray tube screen.

This invention will be described with reference to the drawings, in which:

Fig. 1 shows in block diagram an exemplary system of the present invention,

Fig. 2 shows in circuit diagram certain of the components of the embodiment of Figure 1, Fig. 3 shows wave forms of voltages present at various operating points in the systems, and Fig. 4 shows a cathode ray tube indicator.

In the embodiment shown in Fig. 1, the radio echo ranging system comprises echo ranging transmitter 1 and echo ranging receiver 2. Transmitter 1 is keyed by keying impulses from keyer 3, whose repetition rate determines the repetition rate of the echo ranging system.

The obstacle identification system comprises impulse transmitter 4 and identification response signal receiver 5. For purposes of illustration, in this application the repetition rate of transmitter 1 will be taken to be an integral multiple of the repetition rate of transmitter 4; specifically, the repetition rate of transmitter 1 will be taken to be four times that of transmitter 4. Identification impulse transmitter 4 is keyed by keyer 3 operating through frequency divider 6 and trigger circuit 7.

As shown, trigger circuit 7 also trips sweep generator 8, whose output voltage is applied to cathode ray tube 9. Simultaneously, the output signal from echo ranging receiver 2 and identification signal receiver 5 are also applied to cathode ray tube 9. Despite the different repetition rates of the echo ranging system and the obstacle identification system, in this invention the information received on both systems is indicated upon cathode ray tube screen with uniform intensity of illumination.

This is accomplished in the following manner. Every fourth keying impulse from keyer 3 initiates a cycle of events which is divided into four equal periods of time by successive keying impulses. Echo ranging receiver 2 is turned on during the first period of this cycle, while the identification system transmitter and receiver are turned off. The resulting information from echo ranging receiver 2 is placed on the cathode ray tube screen. During the second, third and fourth periods of this cycle, the echo ranging receiver is turned off and identification signal receiver 5 is turned on. Identification impulse transmitter 4 is caused to operate at the beginning of the second period of the cycle and the resulting information from the obstacle identification system is placed on the cathode ray tube screen during this period. Sweep generator 8 is tripped by an impulse from trigger circuit 7 at the beginning of each of the first two periods of the cycle, but not in the third and fourth periods. With this cycle of events, it will be seen that no information from either the echo ranging system or the obstacle identification system is placed on the cathode ray tube screen during the third and fourth periods. At the end of the fourth period of the cycle, echo ranging receiver 2 is turned back on and identification signal receiver 5 is turned off again to begin a new cycle.

The number of periods in a cycle depends, of course, on the given ratio "n" between the repetition rate of the echo ranging system and the repetition rate of the identification system. In any case, however, two of the periods of the cycle will be similar to the first two periods as described, and in the other "n—2" periods there will be no information of any kind placed on the cathode ray tube screen. By this means the intensity of the signal indication from the two systems on the cathode ray tube screen is kept the same in this invention.

The manner in which the above described cycle of events is brought about will be understood by reference to Fig. 1. Keyer 3 generates a control signal at a given repetition rate which operates transmitter 1 and is at the same time applied to trigger circuit 7 both directly and through frequency divider 6.

Trigger circuit 7 produces two control signals which turn on echo ranging receiver 2 and turn off identification signal receiver 5, respectively, at the start of the first period of each cycle. At the same time trigger circuit 7 produces a control signal which trips sweep generator 8, causing information from the echo ranging system to be placed on the screen of cathode ray tube 9 during this first period. Sweep generator 8 may generate a linear sweep and is operative responsively to an injected positive pulse.

In response to the keying impulse from keyer 3 which initiates the second period of the cycle, trigger circuit 7 produces a control signal for operating identification impulse transmitter 4, and also two control signals which turn on identification signal receiver 5 and turn off echo ranging receiver 2, respectively. Still another control signal from trigger circuit 7 trips sweep generator 8 at the beginning of the second period of the cycle, causing information from the obstacle identification system to be placed on the screen of cathode ray tube 9 during that period.

During the third and fourth periods of the cycle, no control signal is fed from trigger circuit 7 to operate sweep generator 8. In addition, from the above description it will be seen that during the third and fourth periods of the cycle echo ranging receiver 2 and identification impulse transmitter 4 are both inoperative. Thus, no information from either the echo ranging system or the obstacle identification system appears on the screen of cathode ray tube 9 during these periods.

In Fig. 1, components 1, 2, 3, 8, and 9 are conventional components of an echo ranging system. Components 4, 5, and 6, are conventionally included in an IFF system.

Certain of the components of the embodiment of Fig. 1 are shown schematically in Fig. 2. Trigger circuit 7 comprises electron tube 11 and electron tube 12, which are connected for alternate conduction in a regenerative trigger circuit having two stable conditions. The anodes 13 of these two tubes are connected through plate load resistors 14 to positive voltage source 15. The cathodes of the tubes are grounded. Control grid 16 of tube 11 is returned through resistor 17 to source of negative potential 18, while control grid 19 of tube 12 is returned through resistor 20 to source of negative potential 21.

The control signal from keyer 3 is applied directly to control grid 19 of tube 12 and through frequency divider 6 to control grid 16 of tube 11. It is also made available at terminal 30 to be applied to echo ranging transmitter 1. The waveform of this control signal, which consists of negative pulses recurring at the given repetition rate, is illustrated in Fig. 3(a). Points A, B, C, and D, respectively, are the starting points for the four periods of time in the cycle described above. Keyer 3 may be a multivibrator circuit whose rectangular wave output voltage may be differentiated to produce negative voltage pulses recurring at the desired repetition rate.

Frequency divider 6 produces a negative output impulse for every four negative impulses applied thereto. It may be a multivibrator circuit with a lower frequency than that of keyer 3, but synchronized from keyer 3, and with the negative output impulse produced by differentiation of the negative going anode swing of one tube of the multivibrator circuit. The output impulses of frequency divider 6 are applied to control grid 16 of tube 11.

Electron tube 11 is normally conducting, while electron tube 12 is normally cut off. Therefore, applying the negative pulses from keyer 3 to grid 19 of non-conducting tube 12 will normally have no effect on trigger circuit 7. However, as illustrated in Fig. 3(b), on the fourth negative impulse from keyer 3 (shown as point A in Figure 3(a)), a negative impulse is produced by frequency divider 6. This impulse is applied to control grid 16 of conducting tube 11, thus causing a change in trigger circuit 7 by cutting tube 11 off and causing tube 12 to conduct. The next negative impulse from keyer 3, applied to grid 19 of tube 12, will cause that tube to cut off again and will return tube 11 to conduction.

The resulting voltages produced at the anodes of tube 11 and 12 will have wave forms as represented in Figs. 3(c) and 3(d), respectively. These voltages are employed in this invention as explained below to carry out the cycle of events described.

The positive swing of anode 13 of tube 11 at point A is employed to turn on echo ranging receiver 2. The final or video amplifier stage of echo ranging receiver 2 is shown in Fig. 2 as electron tube 22. The signal from the next preceding stage of receiver 2 is introduced at terminal 23, from whence it passes through coupling capacitor 24 and is impressed upon control grid 25 of tube 22. While tube 22 is conducting, any signal placed on terminal 23 will appear amplified but inverted in polarity on anode 26, and from there will pass through capacitor 27 to terminal 28 for application to a deflection electrode of cathode ray tube 9.

Grid 25 is returned through resistor 29 to a negative potential source 31 that is somewhat below the cutoff point for tube 22. When the positive rectangular wave voltage having the wave form shown beween points A and B in Fig. 3(c) is applied to grid 25 through capacitor 32, grid 25 is raised above the cutoff point and an output signal is delivered from echo ranging receiver 2.

The positive voltage swing of anode 13 of tube 11 is employed additionally to supply a trigger voltage for sweep generator 8. For this purpose the positive anode swing is differentiated through capacitor 43 across resistor 44, and is applied to control grid 45 of cathode follower tube 46. The output of tube 46 is supplied to terminal 47 for the purpose of connection to sweep generator 8 to trigger the sweep. Control grid 45 of tube 46 is returned through resistor 44 to source of negative potential 48, which is of such a value that cathode follower 46 passes only the positive voltage impulses which appear across resistor 44. In addition, sweep generator 8 is designed to be sensitive only to positive triggering impulses. The triggering impulse resulting from differentiation of the positive anode swing of tube 11 is shown at point A of Fig. 3(e).

The negative swing of anode 13 of tube 12 at point A is employed to turn off identification signal receiver 5. The final or video amplifier stage of receiver 5 is shown in Fig. 2 as electron tube 33. The signal from the next preceding stage of receiver 5 is introduced at terminal 34, from whence it passes through coupling capacitor 35 and is impressed on control grid 36 of tube 33. Control grid 36 is returned through resistor 37 to a source of negative potential 38, which is somewhat above the cutoff point for tube 33. When the negative rectangular wave voltage having the wave form shown between points A and B in Fig. 3(d) is applied to grid 36 through capacitor 49, the grid is driven below the cutoff point and no output signal is delivered from identification signal receiver 5.

When the second period of the described cycle of events is initiated by a negative pulse from keyer 3 at point B, anode 13 of tube 11 swings negative and anode 13 of tube 12 swings positive as shown in Figs. 3(c) and 3(d), respectively. These voltage changes result when the negative pulse on grid 19 of conducting tube 12 cuts that tube off, thus throwing tube 11 into conduction.

The negative swing of the anode of tube 11 is applied through capacitor 32 to control grid 25 of tube 22 to return the voltage on grid 25 again to a point below the cutoff point for that tube. Tube 22 remains in a non-conducting condition throughout the second, third, and fourth periods of the cycle, so no output signal appears at terminal 28 for application to cathode ray tube 9 during these periods.

The positive voltage swing at anode 13 of tube 12 is employed to turn on identification signal receiver 5, to operate identification impulse transmitter 4, and to trip sweep generator 8.

To effect the first purpose the positive voltage swing is applied to control grid 36 of electron tube 33 through capacitor 49. This raises the voltage on control grid 36 above the cutoff point for tube 33 and permits any signal appearing during the second, third, or fourth periods of the cycle on terminal 34 to be amplified and passed to terminal 42.

To supply a trigger voltage to cause identification impulse transmitter 4 to operate, the positive anode swing of tube 12 is differentiated through capacitor 51 across resistor 52. This provides a positive voltage pulse at terminal 53 which occurs at point B, as shown in Fig. 3(f). Transmitter 4 is designed to be insensitive to the negative voltage pulses which occur, as shown at point A in Fig. 3(f), from the differentiation of the negative anode swing of tube 12.

The positive anode swing of tube 12 is also differentiated through capacitor 54 and across resistor 55. Resistor 55 is connected between control grid 56 of cathode follower 57 and source of negative potential 58. This keeps control grid 56 at such a voltage that there will be conduction through electron tube 57 only when a positive voltage impulse is applied across resistor 55. Conduction in tube 57 produces a positive voltage impulse at terminal 47 which is used to trigger sweep generator 8. This triggering impulse is shown at point B of Fig. 3(e).

In an embodiment of the invention wherein the sweep signal developed by generator 8 is applied as shown in Fig. 5 to terminal 63, which is connected to horizontal deflecting plates 64 of cathode ray tube 9, the signals developed at terminal 28 of echo ranging receiver 2 at terminal 42 of identification signal receiver 5 may be applied to terminal 65, which is connected to vertical deflection plates 66 of cathode ray tube 9, so that the output of the two receivers are developed on the time base as vertical deflections. As receivers 2 and 5 are designed so that their output signals will have opposite polarity, application to vertical deflecting plates 66 of the signal from terminal 28 will produce a deflection on the time base in the opposite direction from that produced by the signal from terminal 42.

It will be understood that the embodiments of this invention which are shown and described are exemplary only, and that the limits of the invention will be ascertained with reference to the appended claims.

What is claimed is:

1. In combination, a radio echo ranging system comprising a pulse transmitter, a recurrent pulse keying source connected to said transmitter to produce the emission of recurrent high powered pulses of electromagnetic energy, an echo receiver for receiving said pulses after reflection from remote objects, an identification system comprising a second pulse transmitter operative to emit identification signals at a sub-harmonic rate with respect to the pulse rate of said radio echo transmitter, a frequency divider fed from said keying source to produce synchronizing signals at said sub-harmonic rate, a dual stability switching means fed from the output of said frequency divider and connected to said radio echo receiver to render said receiver operative in response to one state of stability of said switching means to receive the reflections of said radio echo transmitter pulses, said switching means being further connected to said pulse keying source and responsive to the next succedent pulse from said pulse keying source following the output from said frequency divider to develop the second state of stability of said switching means, and means coupled to said identification transmitter and said radio echo receiver responsive to the second state of stability of said switching means to synchronously disable said radio echo receiver and key said identification transmitter.

2. In combination, a radio echo ranging system comprising a pulse transmitter, a recurrent pulse keying source connected to said transmitter to produce the emission of recurrent high powered pulses of electromagnetic energy, a radio echo receiver for receiving said pulses after reflection from remote objects, an identification system comprising a signal receiver and a second pulse transmitter operative to emit identification signals at a sub-harmonic rate with respect to the pulse rate of said radio echo transmitter, a frequency divider fed from said pulse keying source to produce synchronizing signals at said sub-harmonic rate, a dual stability switching means fed from the output of said frequency divider and connected to said radio echo receiver and said signal receiver to simultaneously render said radio echo receiver operative to receive the reflections of said radio echo transmitter pulses and to disable said signal receiver in response to one state of stability of said switching means, said switching means being further connected to said pulse keying source and responsive to the next succedent pulse from said keying source following the output from said frequency divider to simultaneously disable said radio echo receiver and to render said signal receiver operative, a single cathode ray tube indicator means connected to the output of both of said receivers, and a sawtooth sweep generator for said cathode ray tube indicator coupled to said switching means and responsive to each state of stability of said switching means to produce a sweep voltage for deflecting the beam of the cathode ray tube indicator.

WALTER N. DEAN.

REFERENCES CITED

The following references are of record in the file of this patent:

UNITED STATES PATENTS

| Number | Name | Date |
|---|---|---|
| 2,252,083 | Luck | Aug. 12, 1941 |
| 2,405,238 | Seeley | Aug. 6, 1946 |
| 2,407,199 | Wolff | Sept. 3, 1946 |
| 2,444,452 | Labin | July 6, 1948 |
| 2,466,711 | Kenyon | Apr. 12, 1949 |
| 2,515,178 | Barchok | July 18, 1950 |

FOREIGN PATENTS

| Number | Country | Date |
|---|---|---|
| 116,666 | Australia | Oct. 10, 1941 |